US012304452B2

(12) United States Patent
Tokura et al.

(10) Patent No.: US 12,304,452 B2
(45) Date of Patent: May 20, 2025

(54) DRIVING CONTROL DEVICE, METHOD, AND NON-TRANSITORY STORAGE MEDIUM

(71) Applicant: TOYOTA JIDOSHA KABUSHIKI KAISHA, Toyota (JP)

(72) Inventors: Takaaki Tokura, Nagoya (JP); Katsumi Kono, Toyota (JP); Takeshi Yasuda, Kuwana (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 93 days.

(21) Appl. No.: 18/380,369

(22) Filed: Oct. 16, 2023

(65) Prior Publication Data

US 2024/0042987 A1 Feb. 8, 2024

Related U.S. Application Data

(63) Continuation of application No. 17/496,422, filed on Oct. 7, 2021, now Pat. No. 11,820,354.

(30) Foreign Application Priority Data

Oct. 23, 2020 (JP) ................................ 2020-178313

(51) Int. Cl.
*B60W 10/18* (2012.01)
*B60W 10/08* (2006.01)
(Continued)

(52) U.S. Cl.
CPC ............ *B60W 10/08* (2013.01); *B60W 10/18* (2013.01); *B60W 20/11* (2016.01); *B60W 20/20* (2013.01);
(Continued)

(58) Field of Classification Search
CPC ...... B60W 10/08; B60W 10/18; B60W 20/11; B60W 20/20; B60W 30/18127;
(Continued)

(56) References Cited

U.S. PATENT DOCUMENTS

2019/0375403 A1* 12/2019 Hu ...................... B60W 30/165

FOREIGN PATENT DOCUMENTS

JP 4702086 B2 6/2011

OTHER PUBLICATIONS

U.S. Appl. No. 17/096,442, filed Nov. 12, 2020 in the name of Tokura et al.
(Continued)

*Primary Examiner* — Brian P Sweeney
(74) *Attorney, Agent, or Firm* — Oliff PLC

(57) ABSTRACT

A driving control device mounted on a vehicle includes a processor. The processor is configured to create a speed profile. The processor is configured to approximate the speed profile by a predetermined approximate model and estimate a predicted amount of regenerative energy based on an approximation result. The processor is configured to set, based on the predicted amount of regenerative energy, a first region and a second region in the approximation result as a region in which the vehicle travels using an electric motor, the first region being a region from a timing of starting of the vehicle until first time has elapsed from the timing of starting of the vehicle, and the second region being a region from a timing of deceleration of the vehicle until second time has elapsed from the timing of deceleration of the vehicle.

19 Claims, 10 Drawing Sheets

(51) Int. Cl.
  *B60W 20/11* (2016.01)
  *B60W 20/20* (2016.01)
  *B60W 30/18* (2012.01)
  *B60W 40/105* (2012.01)
  *B60W 50/00* (2006.01)

(52) U.S. Cl.
  CPC .... *B60W 30/18127* (2013.01); *B60W 40/105* (2013.01); *B60W 2050/0028* (2013.01); *B60W 2552/05* (2020.02); *B60W 2720/103* (2013.01)

(58) Field of Classification Search
  CPC ....... B60W 40/105; B60W 2050/0028; B60W 2552/05; B60W 2720/103; B60W 2540/30; B60W 2556/10; B60W 20/12; B60W 50/0097; B60W 10/06; B60W 20/00; B60W 40/00; Y02T 10/62; Y02T 10/70; Y02T 10/72
  See application file for complete search history.

(56) References Cited

OTHER PUBLICATIONS

Jul. 17, 2023 Notice of Allowance Issued In U.S. Appl. No. 17/496,422.

\* cited by examiner

DRIVING CONTROL DEVICE, METHOD, AND NON-TRANSITORY STORAGE MEDIUM

CROSS-REFERENCE TO RELATED APPLICATION(S)

This application is a continuation of U.S. application Ser. No. 17/496,422 filed Oct. 7, 2021, which is based on and claims priority to Japanese Patent Application No. 2020-178313 filed on Oct. 23, 2020. The contents of the above applications are incorporated herein by reference.

BACKGROUND

1. Technical Field

The present disclosure relates to driving control devices that are mounted on vehicles, methods, and non-transitory storage media.

2. Description of Related Art

In a hybrid vehicle including an electric motor and an internal combustion engine, fuel efficiency can be improved by driving control in which the electric motor and the internal combustion engine are efficiently used according to the situation.

Japanese Patent No. 4702086 discloses a vehicle driver assistance device that provides a user with a braking start point at which a regenerative braking operation needs to be started, based on the position of a vehicle and map information of points at which the vehicle needs to be stopped or points at which the vehicle needs to be decelerated such as railroad crossings and curves. In this vehicle driver assistance device, the amount of regenerative energy recovery can be increased by encouraging the user to activate regenerative braking at such a deceleration that allows efficient recovery of regenerative energy.

SUMMARY

In the technique of Japanese Patent No. 4702086, it is possible to predict a point at which recovery of regenerative energy can be expected, but it is not possible to quantitatively predict the amount of regenerative energy recovery. If the amount of regenerative energy recovery can be quantitatively predicted at an early stage, the recovered regenerative energy may be able to be used for suitable driving control.

The present disclosure provides a driving control device that quantitatively predicts the amount of regenerative energy recovery to use the recovered regenerative energy for driving control.

A driving control device according to a first aspect of the present disclosure is mounted on a vehicle including an electric motor and an internal combustion engine as power sources. The driving control device includes a processor. The processor is configured to create a speed profile that predicts a speed of the vehicle at each time. The processor is configured to approximate the speed profile by a predetermined approximate model and estimate a predicted amount of regenerative energy based on an approximation result, the regenerative energy being energy that is recoverable by regenerative braking of the electric motor. The processor is configured to set, based on the predicted amount of regenerative energy, a first region and a second region in the approximation result as a region in which the vehicle travels using the electric motor, the first region being a region from a timing of starting of the vehicle until first time has elapsed from the timing of starting of the vehicle, and the second region being a region from a timing of deceleration of the vehicle until second time has elapsed from the timing of deceleration of the vehicle.

According to the driving control device according to the first aspect of the present disclosure, since the speed profile that predicts the speed of the vehicle is created, the amount of regenerative energy recovery can be quantitatively predicted based on the speed profile, and the predicted amount of regenerative energy recovery can be used for driving control.

In the driving control device according to the first aspect of the present disclosure, the processor may be configured to determine the first time and the second time so as to minimize an amount of fuel predicted to be consumed when the vehicle is caused to travel using the internal combustion engine in a region other than the first region and the second region. In the driving control device according to the first aspect of the present disclosure, the processor may be configured to set only the first region as the region in which the vehicle travels using the electric motor, when an amount of fuel predicted to be consumed when the vehicle is caused to travel using the internal combustion engine in a region other than the first region and the second region is larger than an amount of fuel predicted to be consumed when the vehicle is caused to travel using the internal combustion engine in a region other than the first region, and may be configured to set the first region and the second region as the region in which the vehicle travels using the electric motor, when the amount of fuel predicted to be consumed when the vehicle is caused to travel using the internal combustion engine in the region other than the first region and the second region is smaller than the amount of fuel predicted to be consumed when the vehicle is caused to travel using the internal combustion engine in the region other than the first region. In the driving control device according to the first aspect of the present disclosure, the processor may be configured to determine the first time and the second time based on the predicted amount of regenerative energy minus energy loss in the electric motor.

In the driving control device according to the first aspect of the present disclosure, the processor may be configured to determine the first time and the second time in such a manner that a maximum value of power that is generated by the electric motor in the first region and a maximum value of power that is generated by the electric motor in the second region become equal. In the driving control device according to the first aspect of the present disclosure, the processor may be configured to determine the first time and the second time in such a manner that priority is given to one of the first region and the second region, the one of the first region and the second region having smaller energy loss in the electric motor. In the driving control device according to the first aspect of the present disclosure, the processor may be configured to create the speed profile based on either or both of a driving history of a user and a driving history of a person other than the user.

In the driving control device according to the first aspect of the present disclosure, the predetermined approximate model may be a model that approximates a change in the speed of the vehicle with time as represented by the speed profile by using a sum of Gaussian functions having different peak positions. In the driving control device according to the first aspect of the present disclosure, the processor may be configured to calculate parameters of the Gaussian functions by using at least two of the following values: the speed of the vehicle, a traveled distance, and required travel time. In the driving control device according to the first aspect of the present disclosure, the processor may be configured to derive power based on the approximation result, set one or more periods during which the power is negative as a period during which the regenerative energy is recoverable, and calculate a time integral value of magnitude of the power in the period as an estimated value of the predicted amount of regenerative energy in the period, the power being represented by a sum of power that contributes to a change in kinetic energy of the vehicle and power that is dissipated by running resistance.

In the driving control device according to the first aspect of the present disclosure, the processor may be configured to estimate the predicted amount of regenerative energy based further on one or more variable factors. In the driving control device according to the first aspect of the present disclosure, the variable factor may be at least one of the following factors: a type of road surface, a slope of the road surface, a load weight of the vehicle, and weather. In the driving control device according to the first aspect of the present disclosure, the processor may be configured to correct the power based on the variable factor. In the driving control device according to the first aspect of the present disclosure, the processor may be configured to correct the time integral value based on the variable factor. In the driving control device according to the first aspect of the present disclosure, the processor may be configured to determine that the vehicle travels using the electric motor when a condition is satisfied, the condition including a condition that a sum of energy for the electric motor currently stored in the vehicle and the predicted amount of regenerative energy in the subsequent period is equal to or larger than a threshold.

A driving control method according to a second aspect of the present disclosure is performed by a driving control device that is mounted on a vehicle including an electric motor and an internal combustion engine as power sources. The driving control method includes: creating a speed profile that predicts a speed of the vehicle at each time; approximating the speed profile by a predetermined approximate model and estimating a predicted amount of regenerative energy based on an approximation result, the regenerative energy being energy that is recoverable by regenerative braking of the electric motor; and setting, based on the predicted amount of regenerative energy, a first region and a second region in the approximation result as a region in which the vehicle travels using the electric motor, the first region being a region from a timing of starting of the vehicle until first time has elapsed from the timing of starting of the vehicle, and the second region being a region from a timing of deceleration of the vehicle until second time has elapsed from the timing of deceleration of the vehicle.

A non-transitory storage medium according to a third aspect of the present disclosure stores instructions that are executable by a processor of a driving control device mounted on a vehicle including an electric motor and an internal combustion engine as power sources and that cause the processor to perform functions including: creating a speed profile that predicts a speed of the vehicle at each time; approximating the speed profile by a predetermined approximate model and estimating a predicted amount of regenerative energy based on an approximation result, the regenerative energy being energy that is recoverable by regenerative braking of the electric motor; and setting, based on the predicted amount of regenerative energy, a first region and a second region in the approximation result as a region in which the vehicle travels using the electric motor, the first region being a region from a timing of starting of the vehicle until first time has elapsed from the timing of starting of the vehicle, and the second region being a region from a timing of deceleration of the vehicle until second time has elapsed from the timing of deceleration of the vehicle.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

An embodiment of the present disclosure will be described with reference to the drawings. A driving control device according to the present embodiment performs suitable driving control for improved fuel efficiency by quantitatively predicting the amount of regenerative energy recovery at an early stage by using a speed profile that predicts the speed of a vehicle.

Configuration

Figure 1:
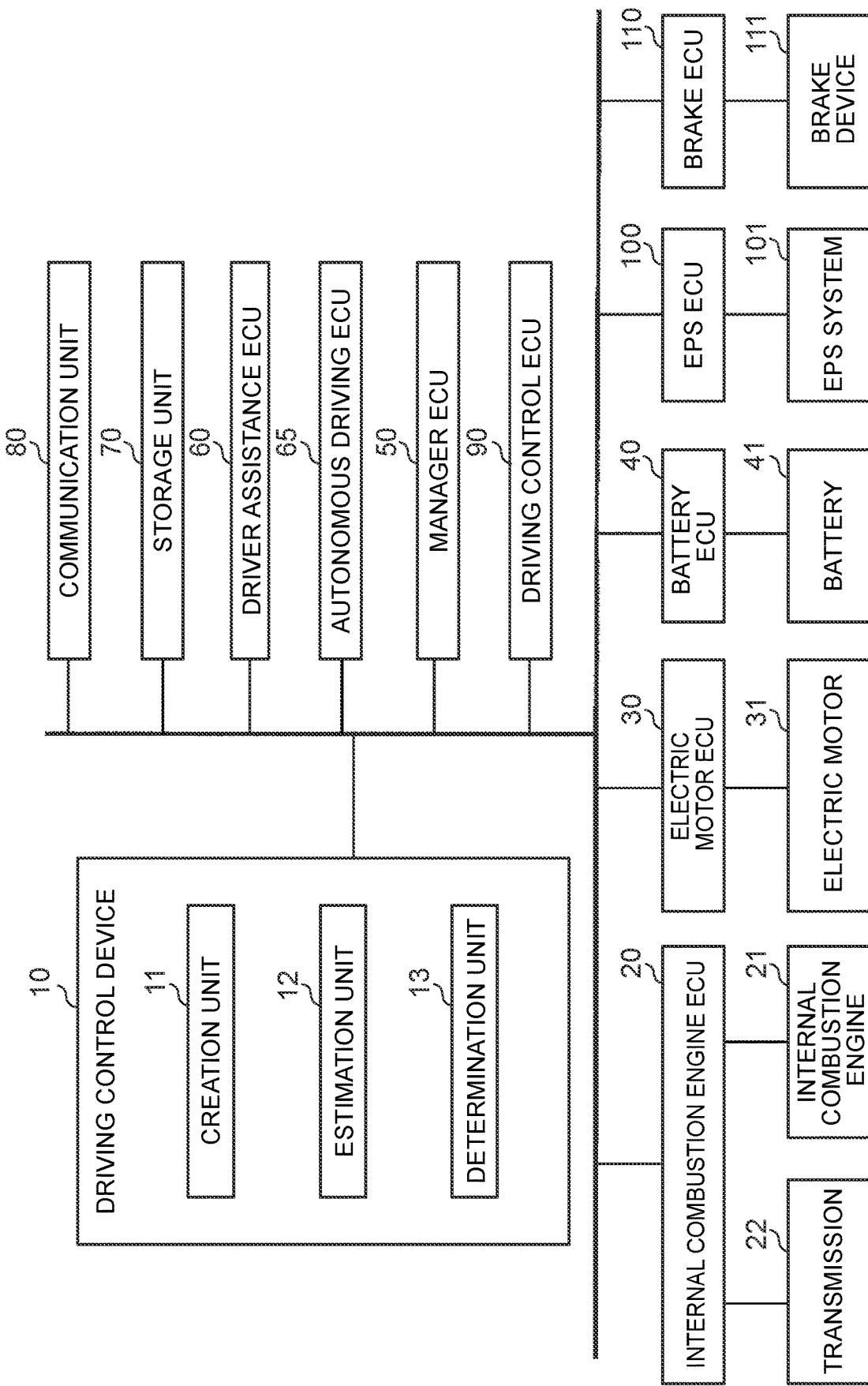
FIG. 1 illustrates functional blocks of a driving control device and its peripheral components according to an embodiment of the present disclosure.

FIG. 1 illustrates functional blocks of a driving control device 10 and its peripheral components according to an embodiment of the present disclosure. The driving control device 10 is mounted on a vehicle. The vehicle includes, in addition to the driving control device 10, an internal combustion engine electronic control unit (ECU) 20, an internal combustion engine 21, a transmission 22, an electric motor ECU 30, an electric motor 31, a battery ECU 40, a battery 41, a manager ECU 50, a driver assistance ECU 60, an autonomous driving ECU 65, a storage unit 70, a communication unit 80, a driving control ECU 90, an electric power steering (EPS) ECU 100, an EPS system 101, a brake ECU 110, and a brake device 111.

In addition to the above configurations, the vehicle may further include various devices such as various sensors like accelerator pedal sensor, brake pedal sensor, camera, and obstacle sensor, vehicle speed sensor, yaw rate sensor, Global Positioning System (GPS) sensor, and a navigation system, although these devices are not shown in the figures.

The internal combustion engine 21 and the electric motor 31 are actuators that serve as a power source for driving the vehicle. The electric motor 31 is also a generator that generates electric power and a braking device that generates a braking force, both by regenerative braking.

The internal combustion engine ECU 20 is an electronic control unit (ECU) that controls the internal combustion engine 21 and the transmission 22 to generate driving torque and to generate braking torque by engine braking. The transmission 22 changes the rotational speed between input and output.

The electric motor ECU 30 is an ECU that controls the electric motor 31 to generate driving torque and to generate braking torque by regenerative braking.

The battery 41 supplies electric power to the electric motor 31 and other devices by electric discharge, and is charged with electric power (recovered energy) obtained by regenerative braking of the electric motor 31. The battery ECU 40 is an ECU that controls power charging and discharging of the battery 41.

The driving control ECU 90 is an ECU that controls the internal combustion engine ECU 20 and the electric motor ECU 30 according to the drive mode that will be described later.

The EPS system 101 is an actuator that performs steering to change the steering angle of the wheels and thus change the traveling direction of the vehicle. The EPS ECU 100 is an ECU that controls the EPS system 101.

The brake device 111 (foot brake device) is an actuator that generates a braking force by a frictional force against members that rotate with the wheels. The brake ECU 110 is an ECU that controls the brake device 111.

The driver assistance ECU 60 is an ECU that performs driver assistance functions such as collision avoidance, following a vehicle in front, and lane keeping. The driver assistance ECU 60 outputs instructions to control movement of the vehicle, such as acceleration, deceleration, and steering angle, based on information acquired from the various sensors etc. The functions of the driver assistance ECU 60 and the number of driver assistance ECUs 60 are not limited.

The autonomous driving ECU 65 is an ECU that performs autonomous driving functions. The autonomous driving ECU 65 outputs instructions to control movement of the vehicle, such as acceleration, deceleration, and steering angle, in order to perform the autonomous driving functions based on information acquired from the various sensors etc.

The manager ECU 50 sends instructions to the driving control ECU 90, the EPS ECU 100, the brake ECU 110, etc. (hereinafter collectively referred to as the actuator ECUs) based on the instructions from the driver assistance ECU 60, the autonomous driving ECU 65, etc. For example, the manager ECU 50 sends an acceleration instruction to the driving control ECU 90, a steering instruction to the EPS ECU 100, and a deceleration instruction to the driving control ECU 90 and the brake ECU 110.

When the manager ECU 50 receives instructions from a plurality of the driver assistance ECUs 60 etc., the manager ECU 50 performs a process called arbitration based on a predetermined rule and sends instructions to the actuator ECUs based on the arbitration result. The arbitration process is a process of determining according to which instruction the vehicle is to be controlled. The manager ECU 50 may acquire details of operations of a steering wheel, a brake pedal, an accelerator pedal, etc. performed by the user and perform the arbitration process for the acquired details of the operations. Alternatively, the actuator ECUs may acquire the details of the operations of the steering wheel, the brake pedal, the accelerator pedal, etc. performed by the user and individually arbitrate between the manual driving operation performed by the user and the instruction from the manager ECU 50.

The storage unit 70 stores one or more driving histories of the user. The driving history is information including the speed of the vehicle at each point in time during a driving period when the user drove the vehicle in the past. For example, the storage unit 70 generates a driving history by periodically storing the speed of the vehicle acquired from the vehicle speed sensor etc. mounted on the vehicle while the vehicle is in the power-on state. For example, the storage unit 70 may be provided as a part of a car navigation system.

The communication unit 80 can wirelessly communicate with a server outside the vehicle, other vehicles, etc. and can receive driving histories other than the user's driving histories obtained based on the travel results of other vehicles.

The driving control device 10 is an ECU including a creation unit 11, an estimation unit 12, and a determination unit 13. The creation unit 11 creates a speed profile based on the driving history. The estimation unit 12 estimates a predicted amount of regenerative energy based on the speed profile created by the creation unit 11. The regenerative energy is energy that can be recovered by regenerative braking. The determination unit 13 determines which of the electric motor 31 and the internal combustion engine 21 is to be used for traveling, based on the predicted amount of regenerative energy estimated by the estimation unit 12. When the electric motor 31 is to be used for traveling, the determination unit 13 determines a region in which the electric motor 31 is to be used.

Each of the above ECUs is typically a computer including a memory and a processor. For example, the processor of each ECU implements functions by reading and executing a program stored in a non-transitory memory. These ECUs are connected to each other by a communication line and can operate cooperatively by communicating with each other as appropriate.

The configurations of the devices mounted on the vehicle and the configuration of the driving control device 10 that are described above are illustrative, and addition, replacement, change, or omission can be made as appropriate. The functions of each device can be implemented by integration of the functions into one device or distribution of the functions between or among a plurality of devices as appropriate.

For example, the driving control device 10 may be provided as an independent ECU. However, the driving control device 10 may be provided as a part of the manager ECU 50, a part of the driving control ECU 90, etc., or the functions of the driving control device 10 may be distributed between or among the manager ECU 50, the driving control ECU 90, etc.

For example, the driving control device 10, the driver assistance ECU 60, the autonomous driving ECU 65, the manager ECU 50, the driving control ECU 90, etc. may be provided as a single ECU. For example, the autonomous driving ECU 65 may not be provided.

Processing

Some examples of the processing that is performed by the driving control device 10 according to the present embodiment will be described in detail.

First Driving Control Process

Figure 2:
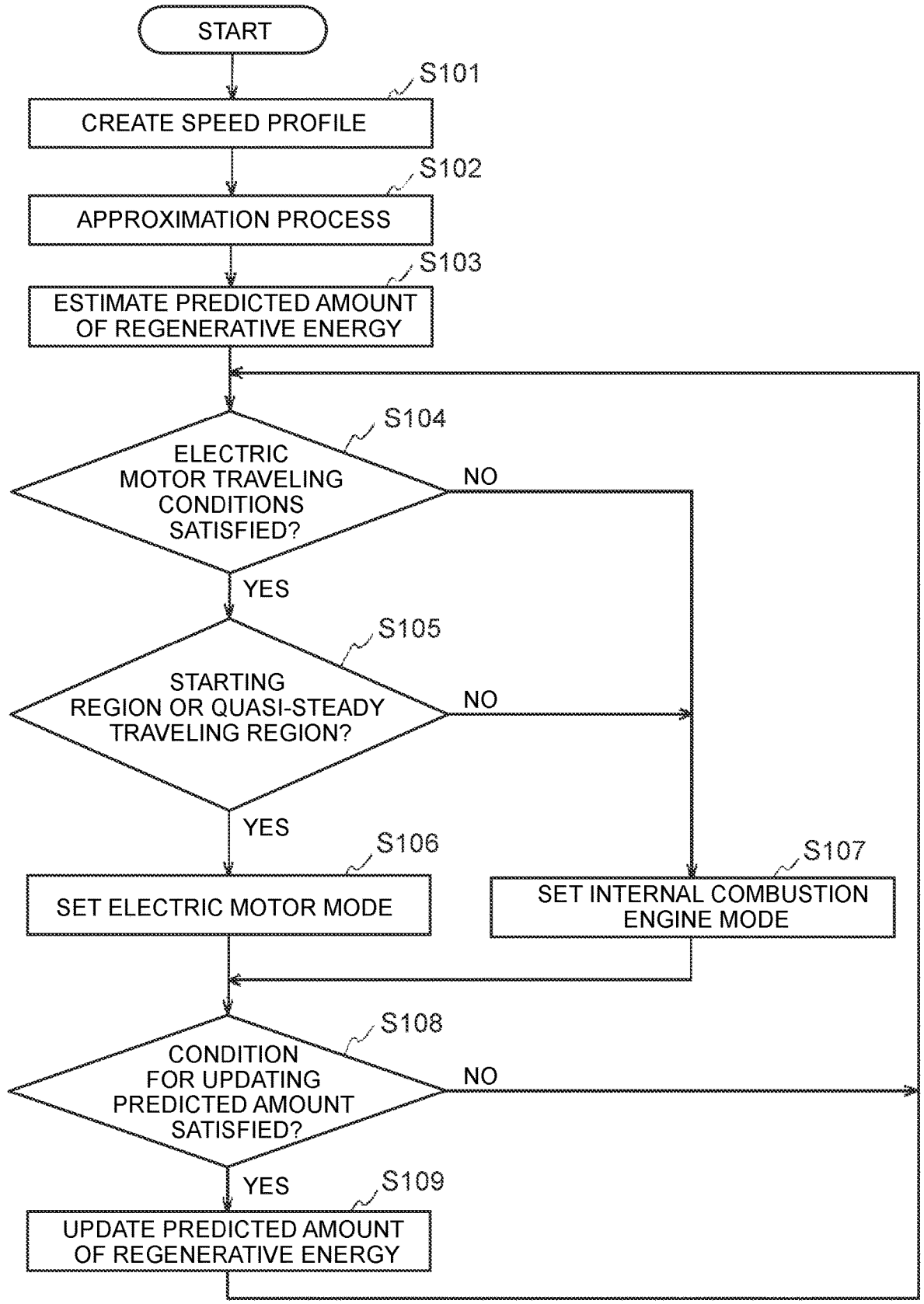
FIG. 2 is a flowchart of a first driving control process according to the embodiment of the present disclosure.

FIG. 2 is a flowchart of a first driving control process. The first driving control process is an example of the driving control process that is performed by the driving control device 10. For example, the first driving control process is started when the user switches the vehicle to the power-on state and starts a trip, and is performed until the user switches the vehicle to the power-off state and ends the trip.

Step S101

The creation unit 11 creates a speed profile. The speed profile is information representing a predicted speed of the vehicle at each point in time during the current trip.

Figure 3:
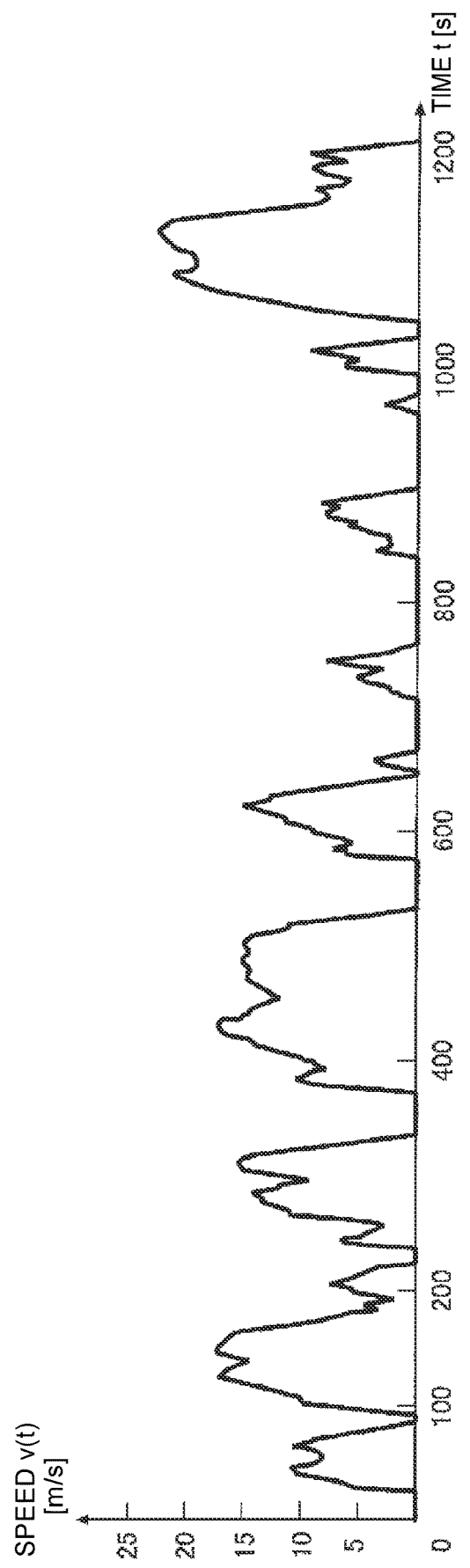
FIG. 3 illustrates an example of a speed profile according to the embodiment of the present disclosure.

FIG. 3 illustrates an example of the speed profile. As an example, FIG. 3 illustrates a speed profile based on a speed change pattern used in the fuel consumption rate test (JC08 mode) defined in Japan, where the abscissa represents the time elapsed from the start of the trip, and the ordinate represents the speed of the vehicle. The graph of the speed profile generally includes a plurality of peaks, indicating that acceleration and deceleration are repeated during one trip.

The creation unit 11 can create a speed profile based on, e.g., driving histories stored in the storage unit 70. In a simple example, in the case where the driving pattern of the user is only a pattern of driving along the same route at the same time of the day on weekdays for commuting, it is considered that the pattern of change in speed with time included in each driving history is substantially the same. In such a case, the creation unit 11 may create a speed profile based on any of the past driving histories.

The storage unit 70 may classify and store the driving histories by associating attributes such as the day of the week and time of the day with the driving histories, and the creation unit 11 may create a speed profile based on the driving history that matches the largest number of attributes of the current trip such as the day of the week and time of the day. Accordingly, even when the number of driving patterns of the user is more than one, the driving pattern can be identified with certain accuracy and the speed profile can be created accurately as long as the driving patterns for each attribute have common characteristics.

The storage unit 70 may acquire a driving route from the navigation system etc. mounted on the vehicle and store a driving history including the acquired driving route, and the creation unit 11 may create a speed profile based on the driving history having a high degree of similarity to the driving route of the current trip. This method can be performed when, e.g., the user sets a driving route for the current trip in the navigation system and the creation unit 11 can acquire the set driving route. This method improves accuracy of the speed profile.

In the case where a driving route has been set for the current trip, the creation unit 11 may inquire a server about road traffic information along the driving route, such as speed limits and congestion forecast, via the communication unit 80 and create a speed profile based on the road traffic information. Alternatively, the creation unit 11 may request a server capable of creating a speed profile based on the road traffic information along the driving route to create a speed profile via the communication unit 80 and acquire the created speed profile.

The creation unit 11 may acquire driving histories other than the driving histories of the user via the communication unit 80 and create a speed profile based on the acquired driving histories. For example, the server collects driving histories associated with the day of the week, time of the day, driving route, etc. from a large number of vehicles and classify and store the collected driving histories, and the creation unit 11 inquires the server to acquire the driving history that matches the current trip to the highest degree based on the classification, and creates a speed profile based on the acquired driving route.

The server may divide people into groups and store the driving histories of each person for each group, and the creation unit 11 may create a speed profile based on the driving history selected from the same group as the user. For example, if people who live or work in the same area are in the same group, accuracy of the speed profile for driving for commuting can be improved.

Alternatively, the creation unit 11 may acquire from one or more other vehicles instead of the server the driving histories stored in the one or more vehicles via the communication unit 80 and may create a speed profile based on the acquired driving histories in a manner similar to that described above.

In each of the above methods, for example, when there is a plurality of candidate driving histories for the speed profile, the creation unit 11 may create a speed profile based on any one of these driving histories or may create a speed profile based on the average of these driving histories. The method for creating the speed profile is not limited, and the above methods may be combined as appropriate. A speed profile may be created using either the driving history of the user or the driving history of a person other than the user, or may be created using both of them.

Step S102

Figure 4:
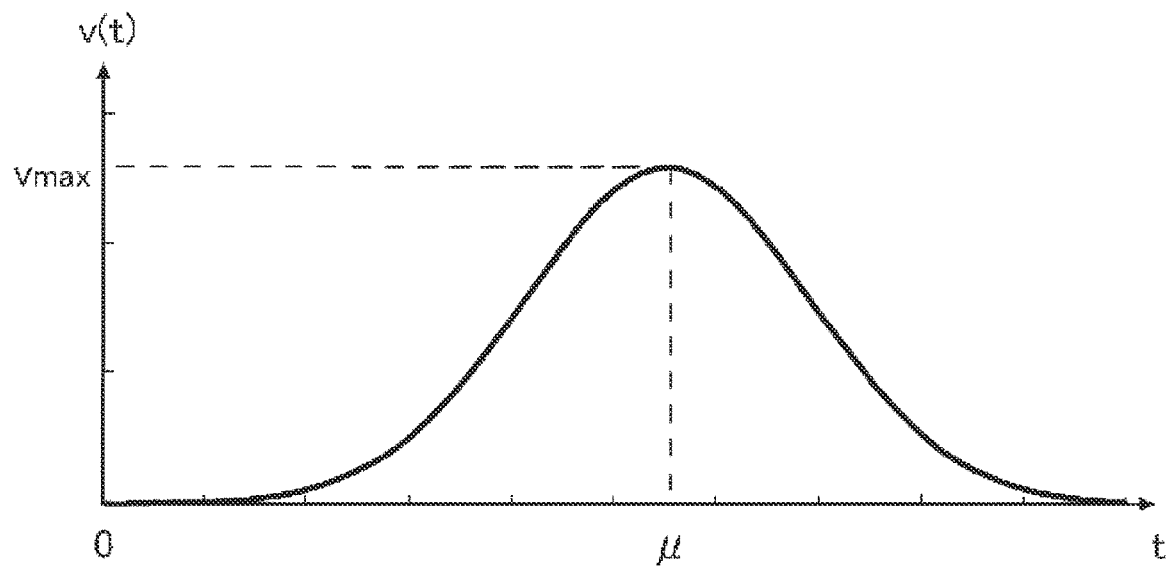
FIG. 4 is a graph of a Gaussian function.

The estimation unit 12 approximates the speed profile using a predetermined approximate model (approximation process). In the present embodiment, the sum of Gaussian functions is used for the approximation. FIG. 4 is a graph of a Gaussian function with time t as a variable (t≥0), as given by Expression 1. In Expression 1, is a parameter that defines a peak position (time), $v_{max}$ is a parameter that defines a peak value, and a is a parameter that defines the spread of distribution.

$$v(t) = v_{max} \cdot \exp\left(\frac{-(t-\mu)^2}{2\sigma^2}\right) \quad \text{(Expression 1)}$$

Figure 5:
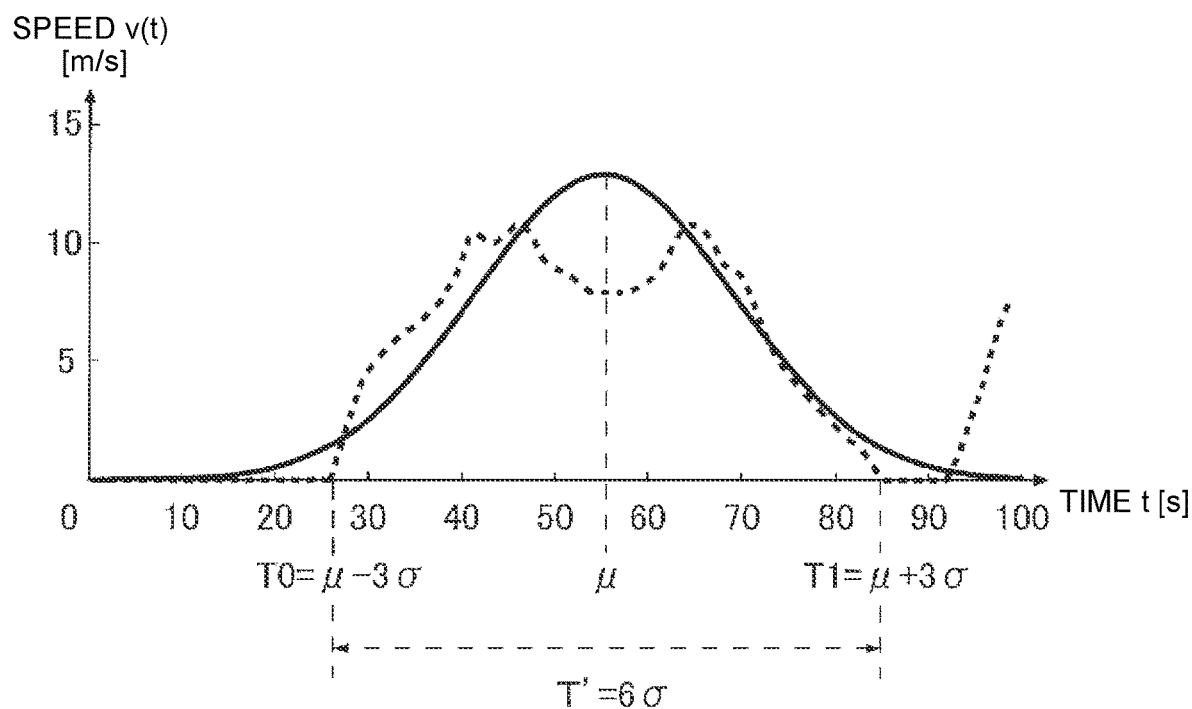
FIG. 5 is a graph of a part of the example of the speed profile according to the embodiment of the present disclosure and the part of the example of the speed profile approximated by a Gaussian function.

FIG. 5 is an approximate graph of a change in speed in the range of 0≤t≤100 (seconds) of the speed profile shown in FIG. 3 with the parameters μ, $v_{max}$, and σ in Expression 1 being suitably determined. In FIG. 5, the speed profile is shown by a dashed line, and the approximate graph is shown by a continuous line.

The method for calculating the parameters μ, $v_{max}$, and σ from the speed profile is not limited, but methods such as the least squares method require a large amount of calculation. An example of a suitable calculation method that requires a reduced amount of calculation will be described. As shown in FIG. 5, the speed profile in an interval from time T0 to time T1 is approximated using a Gaussian function with a range of $\mu \pm 3\sigma$ in this interval, where T0 represents the start time at which the speed represented by the speed profile becomes larger than 0, and T1 represents the stop time at which the speed returns to 0 after the start time. That is, in this method, the parameter a can be calculated by Expression 2, where T' represents the length of the interval.

$$\sigma = \frac{T1 - T0}{6} = \frac{T'}{6} \quad \text{(Expression 2)}$$

Based on this approximation, an average speed $v_{av}$ in this interval is given by Expression 3.

$$v_{av} = \frac{1}{T'} \int_{T0}^{T1} v(t)dt \approx \frac{6}{\sqrt{2\pi} \cdot 0.9973} \cdot v_{max} \quad \text{(Expression 3)}$$

Accordingly, the parameter $v_{max}$ can be calculated by Expression 4. In Expression 4, D represents the distance traveled in this interval.

$$v_{max} = \frac{\sqrt{2\pi} \cdot 0.9973}{6} \cdot v_{av} = \frac{\sqrt{2\pi} \cdot 0.9973}{6} \cdot \frac{D}{T'} \quad \text{(Expression 4)}$$

The parameter can be calculated by Expression 5.

$$\mu = T0 + \frac{T'}{2} = T0 + \frac{D}{2 \cdot v_{av}} \quad \text{(Expression 5)}$$

As described above, when the speed in a single interval in which the speed of the speed profile is positive is approximated using a Gaussian function, the parameters $\mu$, $v_{max}$, and $\sigma$ can be calculated using (i) the time at which the vehicle starts traveling and (ii) the average speed $v_{av}$ of the vehicle, the traveled distance D, or the required travel time T'. The parameters may be calculated using the average speed $v_{av}$ and the required travel time T' that are based on actual values, may be calculated using the traveled distance D and the required travel time T' that are based on actual values, or may be calculated using the traveled distance D and the average speed $v_{av}$ that are based on actual values. According to this calculation method, the parameters of the Gaussian function can be calculated with a small amount of calculation by using simple calculations, and the processing load can be reduced.

In the present embodiment, the entire speed profile is approximated by the sum of Gaussian functions having different peak positions and corresponding to such intervals as described above. The Gaussian functions may have different peak values $v_{maxi}$ and different spreads $\sigma_i$ of distribution. An approximate expression can be given by Expression 6 with $\mu_i$, $v_{maxi}$, and $\sigma_i$ (i=1, 2, . . . , N) as parameters, where N represents the number of Gaussian functions.

$$v(t) = \sum_{i=1}^{N} v_{maxi} \cdot \exp\left(\frac{-(t - \mu_i)}{2\sigma_i^2}\right) \quad \text{(Expression 6)}$$

The parameters $\mu_i$, $v_{maxi}$, and $\sigma_i$ (i=1, 2, . . . , N) can be calculated using the above calculation method. Alternatively, these parameters can be derived using other known fitting techniques. For example, the parameters can also be determined so as to minimize a time integral value S of the absolute value of the difference between the speed value V(t) of the speed profile and the approximate value v(t) for the entire period ($0 \leq t \leq T$) of the speed profile. The time integral value S is given by Expression 7.

$$S = \int_0^T |V(t) - v(t)| dt \quad \text{(Expression 7)}$$

Figure 6:
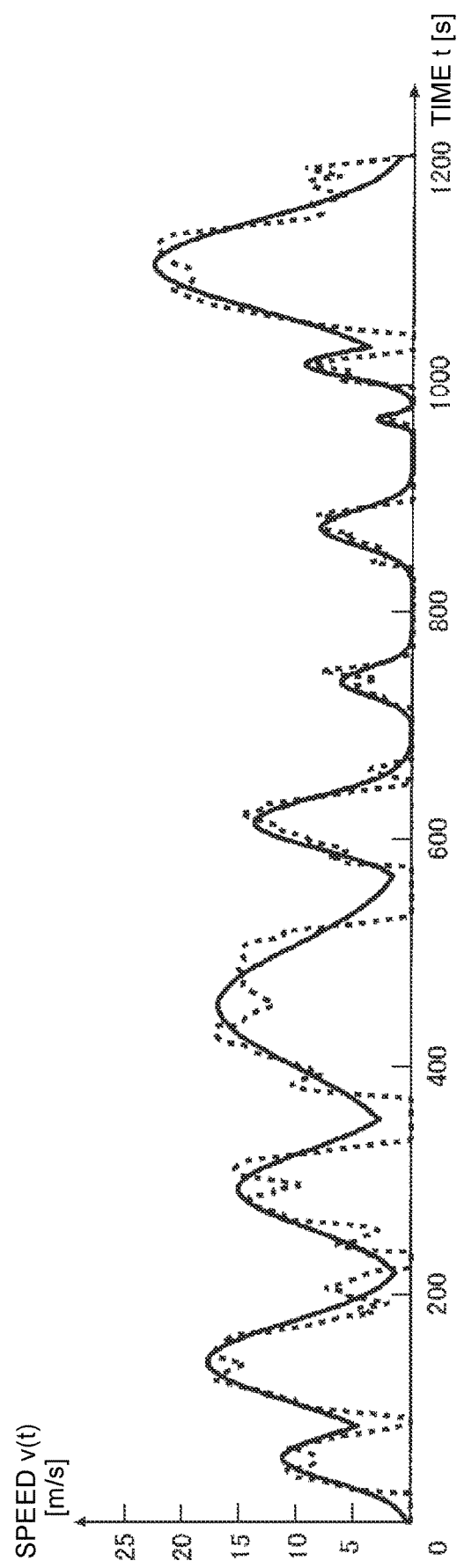
FIG. 6 is a graph of the example of the speed profile according to the embodiment of the present disclosure and the example of the speed profile approximated by Gaussian functions.

FIG. 6 is an approximated graph of a change in speed over the entire period of the speed profile shown in FIG. 3 with the parameters $\mu_i$, $v_{maxi}$, and $\sigma_i$ (i=1, 2, . . . , N) of Expression 6 being derived by this method. In FIG. 6, the speed profile is shown by a dashed line, and the approximate graph is shown by a continuous line. In this example, N=10.

It can be seen from FIG. 6 that a satisfactory approximation that characterizes a change in speed in one trip can be achieved. The value of N is not limited and can be determined according to the length of the trip period of the speed profile and the number of peaks in the change of speed. However, in the case of a trip of, e.g., about 1200 seconds, an approximation that is good enough can be achieved with N=about 10, and an even better approximation can be achieved with N=20. N may be 1 when the trip period is relatively short or the number of peaks is relatively small.

Step S103

The estimation unit 12 estimates a predicted amount of regenerative energy using an approximate model. The regenerative energy is energy that can be obtained by regenerative braking of the electric motor 31. The estimation method will be described below.

First, the estimation unit 12 derives required power P(t). The required power P(t) is the power that should be applied to the vehicle in order to maintain the speed v(t). P(t) is given by Expression 8.

$$P(t) = m \cdot \frac{dv(t)}{dt} \cdot v(t) + \{a \cdot (v(t))^2 + b \cdot v(t) + c\} \cdot v(t) \quad \text{(Expression 8)}$$

In Expression 8, m represents the weight of the vehicle, $m \cdot dv(t)/dt$ represents the rate of change in momentum of the vehicle, and $a \cdot (v(t))^2 + b \cdot v(t) + c$ represents running resistance. The required power P(t) is the sum of the products of these values and the vehicle speed v(t). That is, the required power P(t) is the sum of the power that contributes to a change in kinetic energy of the vehicle and the power that is dissipated by the running resistance, and is the power required to attain the speed v(t) at time t. As shown by Expression 8, the running resistance can be suitably approximated by expressing the running resistance by the sum of a component proportional to the square of the speed, a component proportional to the first power of the speed, and a constant component.

Figure 7:
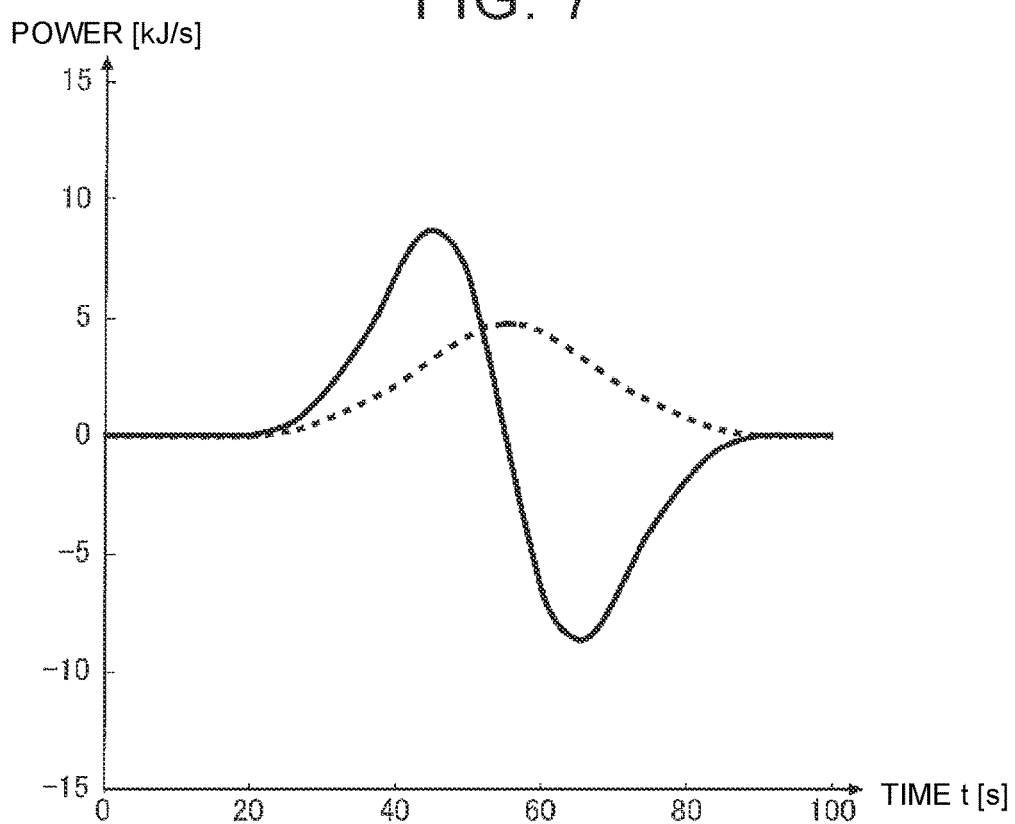
FIG. 7 is a graph of an example of the amount of required power that changes with a change in kinetic energy and the amount of required power that is dissipated by running resistance according to an embodiment of the present disclosure.

In FIG. 7, of the required power P (t) in the range of $0 \leq t \leq 100$ (seconds) of the speed profile shown in FIG. 3, an example of the amount of power that contributes to a change in kinetic energy (the first term on the right side of Expression 8) is shown by a continuous line, and an example of the amount of power that is dissipated by the running resistance (the second term on the right side of Expression 8) is shown by a dashed line, where the abscissa represents time and the ordinate represents power.

Figure 8:
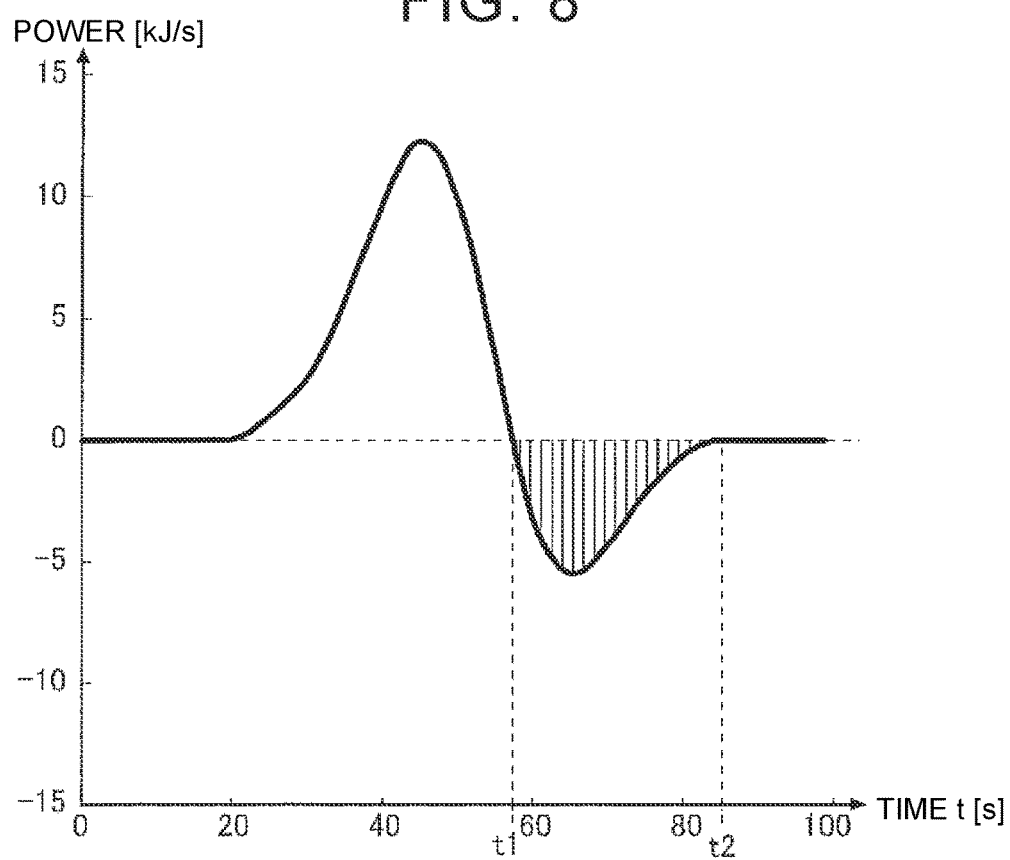
FIG. 8 is a graph of an example of the required power according to the embodiment of the present disclosure.

FIG. 8 is a graph of the total amount of required power P(t), where the abscissa represents time and the ordinate represents power.

Next, the estimation unit 12 estimates a period during which recovery of regenerative energy is predicted to be possible and a predicted amount of regenerative energy recovery based on the required power P(t). In the graph shown in FIG. 8, the period (t1<t<t2) during which the value of the required power P(t) is negative is the period during which recovery of regenerative energy is predicted to be possible. A time integral value of the magnitude of the required power in this period as given by Expression 9, that is, the area of the hatched region in FIG. 8, is an estimated value E of the predicted amount of regenerative energy recovery.

$$E = \int_{t1}^{t2} |P(t)| dt \quad \text{(Expression 9)}$$

Figure 9:
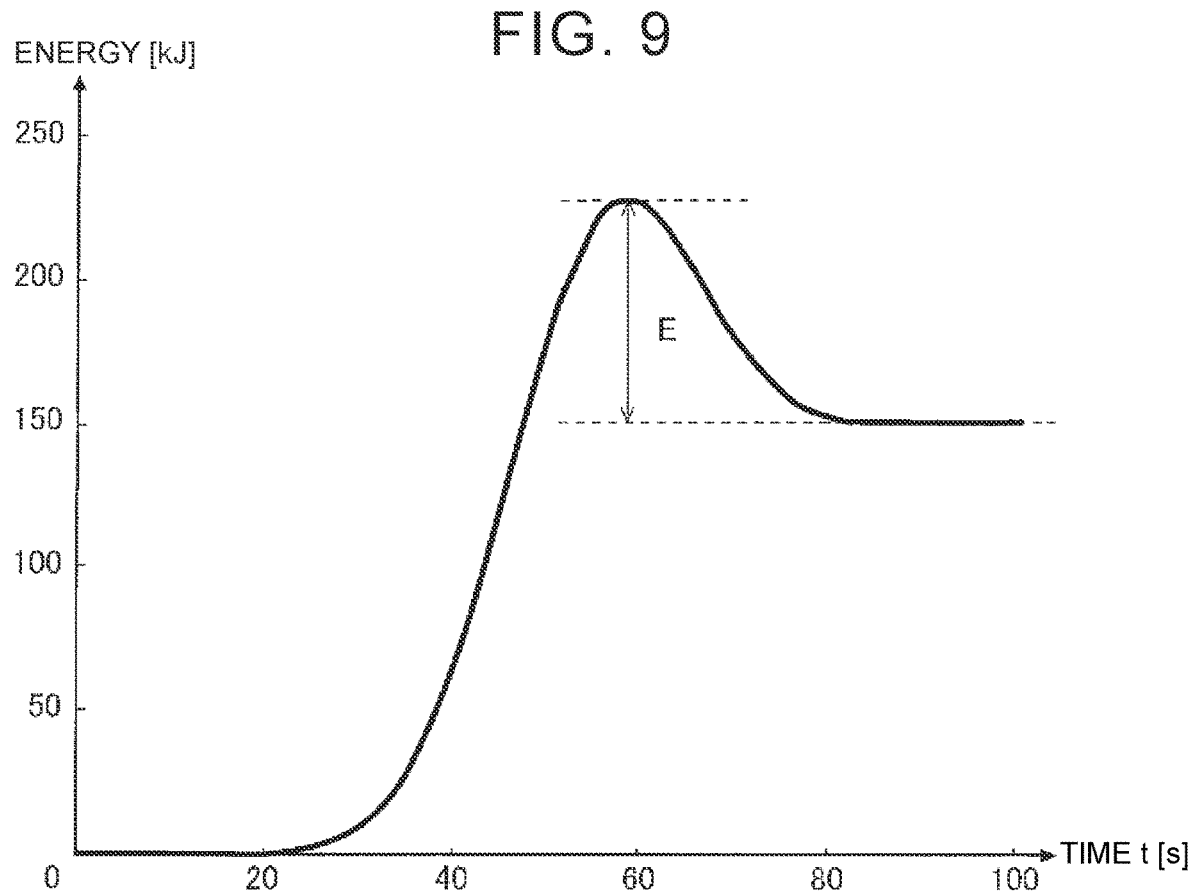
FIG. 9 is a graph of an example of an integral value of the required power according to the embodiment of the present disclosure.

FIG. 9 is a graph of an integral value I(t) of the required power shown in FIG. 8 from time 0 (zero) to time t, where the abscissa represents time and the ordinate represents energy. I(t) is given by Expression 10.

$$I(t) = \int_0^t P(T) dt \quad \text{(Expression 10)}$$

In FIG. 9, the difference between the energy value at the peak and the energy value when the graph becomes flat after the peak is equal to the estimated value E of the predicted amount of regenerative energy recovery.

By extracting one or more periods during which the required power is negative from the entire period of the speed profile and obtaining an integral value of the magnitude of the required power for each period, one or more periods during which the regenerative energy can be recovered and a predicted amount of regenerative energy recovery for each period can be estimated at the start of the trip.

The weight m of the vehicle and the factors a, b, and c are all constants that are basically determined by the characteristics of the vehicle, and satisfactory estimation accuracy is obtained by setting the weight m and the factors a, b, and c to appropriate values. However, when it is possible to acquire one or more variable factors that can affect the required power, the estimation accuracy can further be improved by correcting at least one of the weight m and the factors a, b, and c as follows.

For example, when it is possible for the estimation unit 12 to acquire the load weight of an occupant(s), luggage, etc. by input from a weight sensor etc. mounted on the vehicle or from the user, the estimation unit 12 may correct the weight m of the vehicle by adding the load weight to the weight of the vehicle itself.

When it is possible for the estimation unit 12 to acquire variable factors for the running resistance such as the type of road surface, slope of the road surface, and weather, the estimation unit 12 may correct the factors a, b, and c using these variable factors.

For example, in the case where a driving route has been set for the current trip, the type of road surface and the slope of the road surface can be identified, and the factors can be corrected using this identified information. The information on the type of road surface and the slope of the road surface may be stored in advance in the storage unit 70 in association with map information, or may be acquired by the communication unit 80 from an external server etc. The factors can be corrected using the weather. The weather may be acquired by the various sensors mounted on the vehicle, or may be acquired by the communication unit 80 from the external server etc.

For example, when the road surface is relatively slippery such as a gravel road, the running resistance is corrected to a larger value than when the road is a paved road that is relatively less slippery.

When the slope of the road surface indicates that the road is an uphill road, the running resistance is corrected to a larger value than when the road is a flat road. When the slope of the road surface indicates that the road is a downhill road, the running resistance is corrected to a smaller value than when the road is a flat road. In Expression 8, the influence of increase or decrease in potential energy of the vehicle on the required power P(t) is reflected by the above correction of the running resistance that is made based on the slope of the road surface.

When the weather is rainy or snowy, the running resistance is corrected to a larger value than when the weather is sunny. In the case where the driving route has been set for the current trip, the traveling direction of the vehicle can be estimated. Accordingly, the running resistance may be corrected based on the air flow and wind direction as the weather. For example, when the air flow is not 0 (zero), the running resistance is corrected to a larger value if the wind is a headwind and is corrected to a smaller value if the wind is a tailwind than when the air flow is 0 (zero).

Specifically, when correcting the running resistance in this manner, the values of the factors a, b, and c are changed. In this case, the factors a, b, and c change according to the position of the vehicle, but each of the factors a, b, and c can reduce to a function of time t by the approximate expression of Expression 6. In view of the speed-dependent characteristic of the influence of the variable factors on the running resistance, it is possible to determine as appropriate which of the factors a, b, and c should be corrected to what extent.

Instead of or in addition to the above correction, the estimation unit 12 may correct the estimated value E according to the above variable factors. That is, the estimation unit 12 may determine a correction factor $\alpha$ (e.g., $0 \leq \alpha \leq 1$) for each period and correct the estimated value E according to Expression 11 so that the greater the load weight is or the higher the running resistance is due to the variable factors, the smaller the corrected estimated value E becomes.

$$E = \alpha \cdot \int_{t1}^{t2} |P(t)| dt \quad \text{(Expression 11)}$$

The efficiency of regenerative braking may be reflected in the correction factor $\alpha$ so that the higher the efficiency of regenerative braking is, the larger the corrected estimated value E becomes. For example, the efficiency of regenerative braking can be derived based on the rotational speed of the electric motor 31 expected according to the speed v(t) and an efficiency map corresponding to the rotational speed.

A specific numerical calculation method for the above processing is not limited, and a known calculation algorithm can be used as appropriate. In the present embodiment, the characteristics of the velocity profile can be expressed with a relatively small number of parameters by the approximation using the Gaussian functions. Accordingly, the amount of calculation can be reduced. The amount of calculation can further be reduced by preparing in advance a numerical table of the function values of the Gaussian functions and the derivatives of the Gaussian functions for a plurality of numerical values and the definite integral values of the Gaussian functions in a plurality of ranges of numerical values, and referring to the numerical table as appropriate for use in calculations.

Step S104

The determination unit 13 determines whether electric motor traveling conditions are satisfied. The electric motor traveling conditions are conditions for traveling using the electric motor 31. In the present embodiment, as an example, the determination unit 13 performs control to switch the drive mode between an electric motor mode and an internal combustion engine mode. The electric motor mode is a mode in which the vehicle travels using only the electric motor 31 out of the electric motor 31 and the internal combustion engine 21, and the internal combustion engine mode is a mode in which the vehicle travels using only the internal combustion engine 21 out of the electric motor 31 and the internal combustion engine 21.

The determination unit 13 acquires various kinds of information as appropriate from the various sensors mounted on the vehicle, the driver assistance ECU 60, the manager ECU 50, etc. and makes determinations as follows.

(1) When an intention to decelerate the vehicle is satisfied, it is determined whether the following conditions (1-1) to (1-3) are satisfied. For example, the expression "intention to decelerate the vehicle is satisfied" means that at least one of two conditions, namely either or both of (i) the user has operated the brake pedal and (ii) the user has released the accelerator pedal, are satisfied during traveling of the vehicle, or means that an instruction indicating deceleration or stopping of the vehicle has been sent from the driver assistance ECU 60 or the autonomous driving ECU 65 while the driver assistance functions of the driver assistance ECU 60 or the autonomous driving functions of the autonomous driving ECU 65 are being performed.

(1-1) The speed of the vehicle is equal to or higher than a first speed threshold. When the current actual speed of the vehicle is relatively low, a sufficient rotational speed of the electric motor 31 cannot be obtained during regenerative braking, and efficient recovery of regenerative energy cannot be expected. Accordingly, it is determined whether the speed of the vehicle is equal to or higher than the first speed threshold. The first speed threshold is set to a speed at which a certain level of regeneration efficiency can be expected.

(1-2) The required power is equal to or smaller than a first power threshold. When the current required power is relatively large, the electric motor 31 may not be able to output the required power even when the internal combustion engine 21 can output the required power. This is because the maximum output of the electric motor 31 is typically smaller than the maximum output of the internal combustion engine 21. Accordingly, it is determined whether the required power is equal to or smaller than the first power threshold. The first power threshold is set to power that can be output by the electric motor 31.

(1-3) The state of charge (SOC) of the battery 41 is equal to or lower than a first SOC threshold. When the current SOC of the battery 41 is high, the battery 41 can be charged with only a small amount of power, and there is a possibility that the battery 41 may not be able to store all of the regenerative energy. Accordingly, it is determined whether the SOC of the battery 41 is equal to or lower than the first SOC threshold. The first SOC threshold is set to an SOC at which the battery 41 can be charged with a sufficient amount of power. Instead of the SOC, the amount of power stored in the battery 41 may be used for the determination.

When all of the determination results of (1-1) to (1-3) are YES and the electric motor traveling conditions are thus satisfied, the routine proceeds to step S105. Otherwise, the routine proceeds to step S106.

(2) In cases other than (1) described above, that is, in cases other than when an intention to decelerate the vehicle is satisfied, it is determined whether the following conditions (2-1) to (2-4) are satisfied.

(2-1) The speed of the vehicle is lower than a second speed threshold. When the current actual speed of the vehicle is relatively high, traveling using the internal combustion engine 21 is typically more efficient than traveling using the electric motor 31. Accordingly, it is determined whether the speed of the vehicle is lower than the second speed threshold. The second speed threshold is set to a speed at which traveling using the electric motor 31 can be expected to be more efficient. The second speed threshold is a speed higher than the first speed threshold.

(2-2) The required power is equal to or smaller than the first power threshold. For a reason similar to that described above in (1-2), it is determined whether the required power is equal to or smaller than the first power threshold. The first power threshold is set to power that can be output by the electric motor 31.

(2-3) The total of energy for the electric motor currently stored in the vehicle and the expected amount of regenerative energy in the next period during which the regenerative energy can be recovered is equal to or larger than a first energy threshold. When the sum of the amount of power that is currently stored in the battery 41 of the vehicle and can be supplied to the electric motor 31 and the predicted amount of power that can be recovered in the subsequent period during which regenerative energy can be recovered is relatively small, traveling using the electric motor 31 reduces the amount of power stored in the battery 41, and this may affect the functions of the vehicle. Accordingly, it is determined whether this sum is equal to or larger than the first energy threshold. The first energy threshold is set to a sufficient amount.

(2-4) The vehicle is currently traveling using the internal combustion engine 21, and a first time threshold or more has elapsed since the internal combustion engine 21 was started. When the internal combustion engine 21 is stopped immediately after it is started, it may give the user a feel that the internal combustion engine 21 is malfunctioning or that the vehicle behavior is unstable, causing discomfort or anxiety. Accordingly, it is determined whether the first time threshold or more has elapsed since the internal combustion engine 21 was started. The first time threshold is set to elapsed time that is long enough not to cause discomfort etc. even when the internal combustion engine 21 is stopped.

When all of the determination results of (2-1) to (2-4) are YES and the electric motor traveling conditions are thus satisfied, the routine proceeds to step S105. Otherwise, the routine proceeds to step S106.

Step S105

Figure 10:
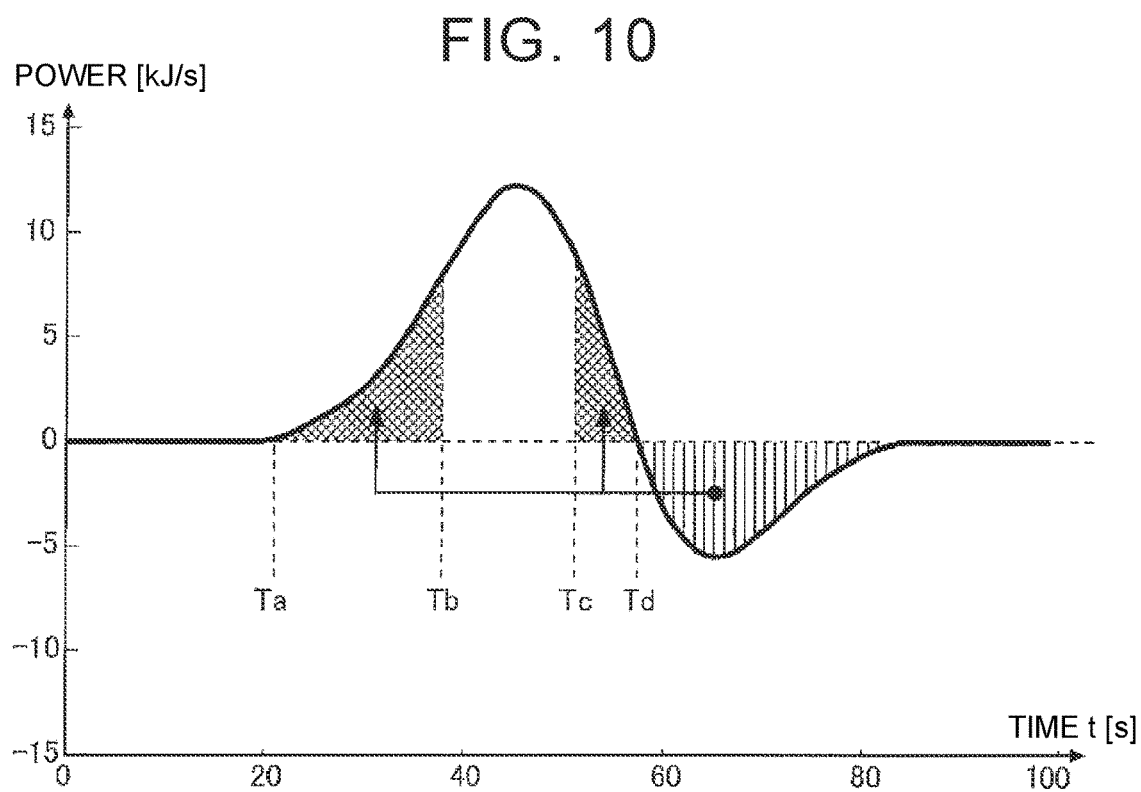
FIG. 10 illustrates a starting region and a quasi-steady traveling region in the graph of the example of the required power.

The determination unit 13 determines whether a region in which the vehicle is going to travel is a starting region or a quasi-steady traveling region. In the present embodiment, the vehicle is caused to travel using the electric motor 31 in two regions, the starting region and the quasi-steady traveling region. The starting region (first region) is a predetermined time region from the time when the vehicle starts to move from rest until some time has passed since the vehicle started to move. As shown in a graph of the total amount of the required power P(t) in FIG. 10, the starting region (first region) is a period from the timing (time Ta) of the starting of the vehicle at which the value of the required power P(t) becomes positive to the timing (time Tb) when first time has elapsed from the timing (time Ta) of the starting of the vehicle (Ta≤t≤Tb). The quasi-steady traveling region (second region) is a predetermined time region in which the power required for the vehicle is small as, e.g., the vehicle travels steadily at somewhat low speeds. As shown in the graph of the total amount of the required power P(t) in FIG.

10, the quasi-steady traveling region (second region) is a period from the timing (time Td) at which the value of the required power P(t) becomes 0 (zero) to the timing (time Tc) that is second time before time Td (Tc≤t≤Td). The timing (time Tc) is set to any desired deceleration timing after the value of the required power P(t) starts to decrease (after the peak value). The starting region and the quasi-steady traveling region are the regions in which traveling using the electric motor 31 is more efficient than traveling using the internal combustion engine 21 and in which fuel consumption is reduced. Allocation of the predicted amount of regenerative energy to the starting region and the quasi-steady traveling region is appropriately set using, e.g., the following method.

Figure 11:
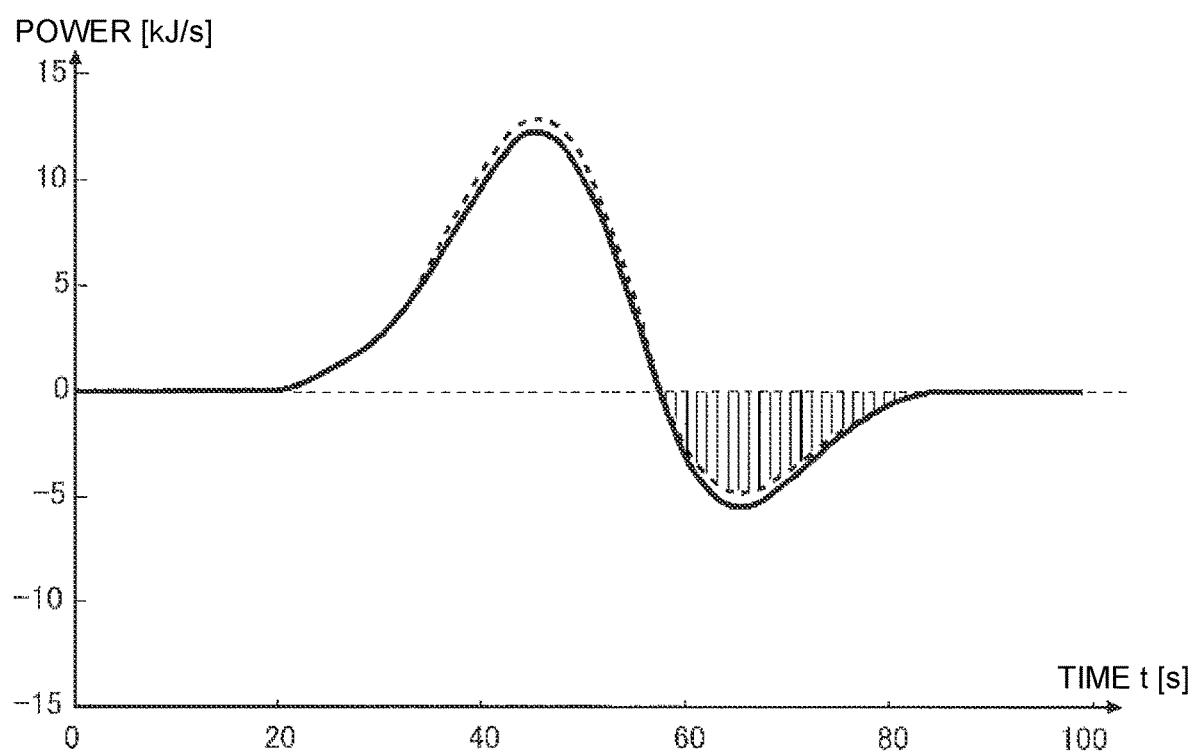
FIG. 11 is a graph of the example of required power, illustrating loss in an electric motor.

Typically, a certain amount of loss occurs in the electric motor 31. Therefore, as shown in FIG. 11, the required power P(t) that is used for traveling of the vehicle as shown by a continuous line is actually smaller than the required power P(t) that is generated by the electric motor 31 as shown by a dashed line. Accordingly, the allocation of the predicted amount of regenerative energy is performed based on the predicted amount of regenerative energy and the required power P(t) in view of the energy loss (conversion efficiency) in the electric motor 31. That is, the allocation of the regenerative energy (setting of the first time and the second time) is performed based on the predicted amount of regenerative energy estimated by the estimation unit 12 minus the amount of energy loss in the electric motor 31.

A first method is a method in which the predicted amount of regenerative energy is allocated to the starting region and the quasi-steady traveling region so as to minimize fuel consumption. In this first method, fuel consumption of the following pattern is first calculated: a pattern in which all of the predicted amount of regenerative energy is allocated to the starting region. That is, fuel consumption when the vehicle travels using the electric motor 31 during the period from time Ta to Tb in FIG. 10 and travels using the internal combustion engine 21 during the remaining period from time Tb to Td is calculated. Next, fuel consumption of the following pattern is calculated: a pattern in which the amount of regenerative energy for one step on a time scale based on the temporal resolution is allocated to the quasi-steady traveling region and the amount of regenerative energy to be allocated to the starting region is reduced by the amount allocated to the quasi-steady traveling region. That is, fuel consumption when the vehicle travels using the electric motor 31 from time Ta to Tb and from time Tc to Td in FIG. 10 and travels using the internal combustion engine 21 from time Tb to Tc is calculated. Thereafter, fuel consumption in each allocation pattern is calculated while increasing the amount of regenerative energy to be allocated to the quasi-steady traveling region in increments of the amount of regenerative energy for one step and decreasing the amount of regenerative energy to be allocated to the starting region in increments of the regenerative energy for one step. Finally, fuel consumption of the following pattern is calculated: a pattern in which all of the predicted amount of regenerative energy is allocated to the quasi-steady traveling region. That is, fuel consumption when the vehicle travels using the internal combustion engine 21 during the period from time Ta to Tc in FIG. 10 and travels using the electric motor 31 during the remaining period from time Tc to Td is calculated. As a result of calculating the fuel consumption for all of the patterns, the allocation ratio (first time and second time) of the pattern with the smallest fuel consumption is set as an optimum solution.

A second method is a method in which the predicted amount of regenerative energy is allocated to the starting region and the quasi-steady traveling region so that a peak value of the power that is generated in the starting region and a peak value of the power that is generated in the quasi-steady traveling region become equal. In the second method, the power that is ½ of the maximum value of the required power P(t) in view of the loss in the electric motor 31 is first obtained as a peak value. Next, times Tb and Tc at which the generated power reaches a peak value in the starting region and the quasi-steady traveling region are obtained, and a cumulative value of the regenerative energy required to generate power during the period from time Ta to Tb in the starting region and the period from time Tc to Td in the quasi-steady traveling region (cumulative required regenerative energy) is calculated. Control using a binary search method is then performed. Namely, the calculated cumulative required regenerative energy is compared with the predicted amount of regenerative energy (predicted regenerative energy). When the cumulative required regenerative energy is larger than the predicted regenerative energy, control is performed in a direction in which the peak value is reduced. When the predicted regenerative energy is larger than the cumulative required regenerative energy, control is performed in a direction in which the peak value is increased. Such a peak value that the cumulative required regenerative energy is equal to the predicted regenerative energy is eventually calculated by this control. Then, the allocation ratio (first time and second time) at this calculated peak value is set as an optimum solution.

A third method is a method in which the predicted amount of regenerative energy is allocated to the starting region and the quasi-steady traveling region in such a manner that the regenerative energy is preferentially allocated to the region in which the loss in the electric motor 31 is smaller. In the third method, the difference value between the power to be used for traveling of the vehicle (continuous line in FIG. 11) and the power to be generated by the electric motor 31 (dashed line in FIG. 11) is calculated in each of the starting region and the quasi-steady traveling region. The time in the starting region and the time in the quasi-steady traveling region at which the difference value is calculated are set in advance. For example, time Tb' (Ta<Tb'<Tb) in the starting region and time Tc' (Tc<Tc'<Td) in the quasi-steady traveling region are set as the times at which the difference value is calculated. When the difference value at time Tb' in the starting region is smaller than the difference value at time Tc' in the quasi-steady traveling region, the starting region is determined to be a region to be subjected to a search process. When the difference value at time Tb' in the starting region is larger than the difference value at time Tc' in the quasi-steady traveling region, the quasi-steady traveling region is determined to be a region to be subjected to the search process. Next, a cumulative value of the regenerative energy required to generate power during the period from time Ta to Tb' in the starting region and the period from time Tc' to Td in the quasi-steady traveling region (cumulative required regenerative energy) is calculated. When the region to be subjected to the search process is the starting region, the amount of regenerative energy to be allocated to the starting region is increased in increments of the amount of regenerative energy for one step on the time scale based on the temporal resolution until the calculated cumulative required regenerative energy reaches the predicted amount of regenerative energy. When the region to be subjected to the search process is the quasi-steady traveling region, the amount of regenerative energy to be allocated to the quasi-steady traveling region is increased in increments of the amount of regenerative energy for one step on the time scale based on the temporal resolution until the calculated cumulative required regenerative energy reaches the predicted amount of regenerative energy. The allocation ratio (first time and second time) when the cumulative required regenerative energy reaches the predicted amount of regenerative energy is set as an optimum solution.

Like the third method, a fourth method is a method in which the predicted amount of regenerative energy is allocated to the starting region and the quasi-steady traveling region in such a manner that the regenerative energy is preferentially allocated to the region in which the loss in the electric motor 31 is smaller. In the fourth method, the power (absolute value) in view of the loss in the electric motor 31 is compared between the starting region and the quasi-steady traveling region. The time in the starting region and the time in the quasi-steady traveling region at which the power is compared are set in advance. For example, time Tb' (Ta<Tb'<Tb) in the starting region and time Tc' (Tc<Tc'<Td) in the quasi-steady traveling region are set as the times at which the power is compared. When the power at time Tb' in the starting region is smaller than the power at time Tc' in the quasi-steady traveling region, the starting region is determined to be a region to be subjected to the search process. When the power at time Tb' in the starting region is larger than the power at time Tc' in the quasi-steady traveling region, the quasi-steady traveling region is determined to be a region to be subjected to the search process. Next, a cumulative value of the regenerative energy required to generate power during the period from time Ta to Tb' in the starting region and the period from time Tc' to Td in the quasi-steady traveling region (cumulative required regenerative energy) is calculated. When the region to be subjected to the search process is the starting region, the amount of regenerative energy to be allocated to the starting region is increased in increments of the amount of regenerative energy for one step on the time scale based on the temporal resolution until the calculated cumulative required regenerative energy reaches the predicted amount of regenerative energy. When the region to be subjected to the search process is the quasi-steady traveling region, the amount of regenerative energy to be allocated to the quasi-steady traveling region is increased in increments of the amount of regenerative energy for one step on the time scale based on the temporal resolution until the calculated cumulative required regenerative energy reaches the predicted amount of regenerative energy. The allocation ratio (first time and second time) when the cumulative required regenerative energy reaches the predicted amount of regenerative energy is set as an optimum solution.

Since the above first method is a method for finding an optimum solution by brute-force calculations, the allocation ratio between the starting region and the quasi-steady traveling region for minimizing the fuel consumption obtained as a calculation result is reliable. On the other hand, in the above second to fourth methods, the allocation ratio between the starting region and the quasi-steady traveling region for minimizing the fuel consumption obtained as a calculation result is somewhat less reliable than in the first method. However, the calculation load on the driving control device 10 can be reduced as compared to the first method. The second to fourth methods are therefore useful when it is difficult to use the first method due to, e.g., limitations such as performance of a microcomputer mounted on the vehicle.

When the region in which the vehicle is going to travel is either the starting region or the quasi-steady traveling region, the routine proceeds to step S106. Otherwise, the routine proceeds to step S107.

Step S106

The determination unit 13 sets the drive mode to the electric motor mode. In the present embodiment, the determination unit 13 notifies the driving control ECU 90 that the drive mode is set to the electric motor mode. The driving control ECU 90 causes the electric motor ECU 30 to control traveling using the electric motor 31.

In the electric motor mode, regenerative braking is performed and the kinetic energy of the vehicle is recovered as electric power. When a certain level or higher of deceleration is required by the user depressing the brake pedal to a large extent or by the driver assistance ECU 60 sending a sudden deceleration instruction having a high priority for collision avoidance etc., the manager ECU 50 and the brake ECU 110 perform control to cause the brake device 111 to generate a braking force, in order to generate a sufficient braking force.

Step S107

The determination unit 13 sets the drive mode to the internal combustion engine mode. In the present embodiment, the determination unit 13 notifies the driving control ECU 90 that the drive mode is set to the internal combustion engine mode. The driving control ECU 90 causes the internal combustion engine ECU 20 to control traveling using the internal combustion engine 21.

Step S108

The creation unit 11 determines whether a condition for updating the predicted amount of regenerative energy is satisfied. For example, the updating condition is that the degree of matching between a change in speed with time during actual traveling up to the present and the speed profile created in step S101 is lower than a predetermined allowable value. The degree of matching can be derived by using a known method as appropriate. For example, the degree of matching can be derived based on the integral value of the absolute value of the difference between the speed value of the speed profile and the actual speed value over a certain period of time in the past. When the degree of matching is lower than the allowable value, it is considered that the accuracy of the period during which the regenerative energy can be recovered, the predicted amount of regenerative energy, etc. is also low. When the updating condition is satisfied, the routine proceeds to step S109. Otherwise, the routine proceeds to step S104.

Step S109

The estimation unit 12 updates the period during which the regenerative energy can be recovered and the predicted amount of regenerative energy by re-estimating the period during which the regenerative energy can be recovered and the predicted amount of regenerative energy. The updating method is not particularly limited. However, for example, the estimation unit 12 can perform the update by deforming the speed profile, namely compressing or expanding the time scale of the speed profile, so as to increase the degree of matching with a change in speed with time during actual traveling up to the present, and then performing processes similar to steps S102 and S103 based on the deformed speed profile.

Alternatively, the creation unit 11 may select a driving history other than the driving history used to create the current speed profile and create a new speed profile based on the selected driving history by a process similar to step S101, and the estimation unit 12 may perform the update by performing processes similar to steps S102 and S103 based on the newly created speed profile. For example, when the vehicle comes to a stop, a new trip is considered to be started from that time from that place, and a driving history may be selected in a manner similar to that in step S101.

Further, since the values of the variable factors described above may have changed in such an update, the correction may be made using the most recent values of the variable factors. Performing such an update can improve the estimation accuracy of the period during which the regenerative energy can be recovered and the predicted amount of regenerative energy. After this step, the routine proceeds to step S104.

Second Driving Control Process

Figure 12:
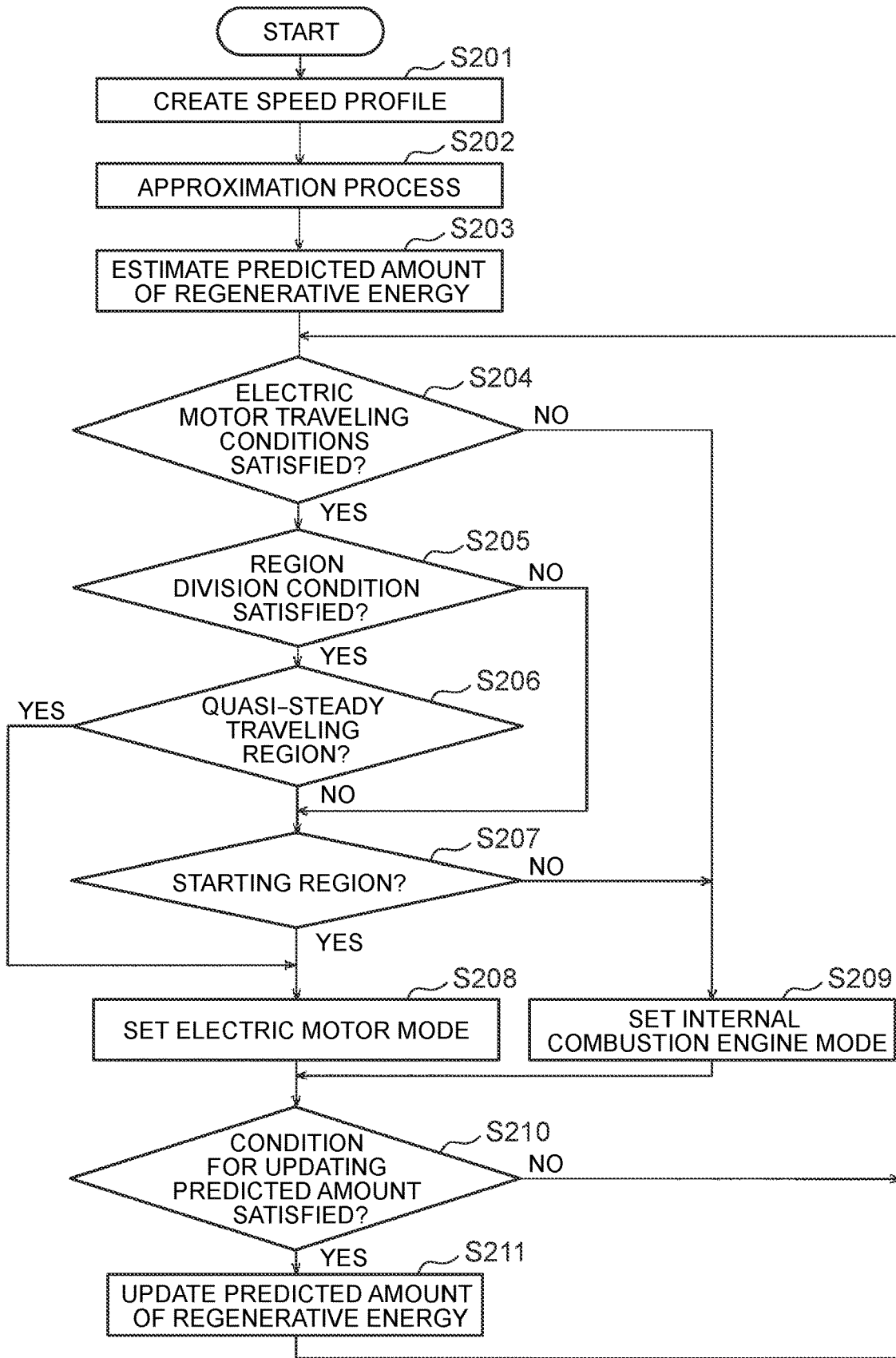
FIG. 12 is a flowchart of a second driving control process according to the embodiment of the present disclosure.

FIG. 12 is a flowchart of a second driving control process. The second driving control process is an example of the driving control process that is performed by the driving control device 10. The second driving control process is significantly different from the first driving control process in steps S205, S206, and S207. For example, the second driving control process is started when the user switches the vehicle to the power-on state and starts a trip, and is performed until the user switches the vehicle to the power-off state and ends the trip.

Step S201

The creation unit 11 creates a speed profile. The speed profile is information representing a predicted speed of the vehicle at each point in time during the current trip. The method for creating the speed profile is as described in step S101 of the first driving control process.

Step S202

The estimation unit 12 performs an approximation process in which the speed profile created in step S201 is approximated using a predetermined approximate model. The parameters of Gaussian functions used as an approximate model, the sum of Gaussian functions, the approximation method, etc. are as described in step S102 of the first driving control process.

Step S203

The estimation unit 12 estimates a predicted amount of regenerative energy based on the result of the approximation process of the speed profile performed in step S202. The regenerative energy is energy that can be obtained by regenerative braking of the electric motor 31. The method for estimating the predicted amount of regenerative energy is as described in step S103 of the first driving control process.

Step S204

The determination unit 13 determines whether electric motor traveling conditions are satisfied. The electric motor traveling conditions are conditions for traveling using the electric motor 31. In the present embodiment, as an example, the determination unit 13 performs control to switch the drive mode between an electric motor mode and an internal combustion engine mode. The electric motor mode is a mode in which the vehicle travels using only the electric motor 31 out of the electric motor 31 and the internal combustion engine 21, and the internal combustion engine mode is a mode in which the vehicle travels using only the internal combustion engine 21 out of the electric motor 31 and the internal combustion engine 21. The electric motor traveling conditions and whether the electric motor traveling conditions are satisfied are as described in step S104 of the first driving control process. When the electric motor traveling conditions are satisfied, the routine proceeds to step S205. Otherwise, the routine proceeds to step S209.

Step S205

The determination unit 13 determines whether a region division condition is satisfied. In the first driving control process, the vehicle is caused to travel using the electric motor 31 in two regions, the starting region and the quasi-steady traveling region. However, the second driving control process further provides an option to cause the vehicle to travel using the electric motor 31 only in the starting region. The region division condition is used to determine whether a region in which the vehicle is caused to travel using the electric motor 31 should be only one region, namely only the starting region, or should be divided into two regions, namely the starting region and the quasi-steady traveling region. The starting region and the quasi-steady traveling region are as described in step S105 of the first driving control process.

Figure 13:
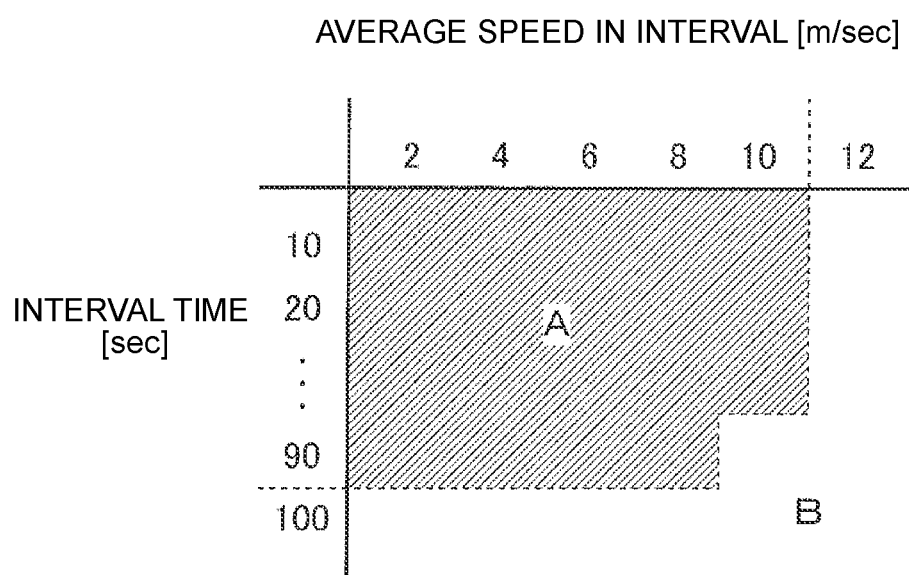
FIG. 13 illustrates an example of a two-dimensional map that is used to determine whether a region division condition is satisfied.

An example of the region division condition will be described with reference to FIG. 13. FIG. 13 is a two-dimensional map with the average speed in an interval and the interval time as parameters. As described in step S102 of the first driving control process, the average speed in an interval and the interval time are the average speed $v_{av}$ and the required travel time T' for each interval in which the speed of the speed profile is positive, and are calculated in the approximation process. In the two-dimensional map of FIG. 13, any combination of the average speed in an interval and the interval time included in an unshaded area B is a combination for which the region division condition is satisfied. It can be estimated from the combinations of the average speed in an interval and the interval time included in the area B that the vehicle travels steadily at somewhat low speeds.

When the region division condition is satisfied according to the combination of the average speed in an interval and the interval time, the routine proceeds to step S206. Otherwise, the routine proceeds to step S207.

Step S206

The determination unit 13 determines whether a region in which the vehicle is going to travel is the quasi-steady traveling region. When the region in which the vehicle is going to travel is the quasi-steady traveling region, the routine proceeds to step S208. Otherwise, the routine proceeds to step S207.

Step S207

The determination unit 13 determines whether the region in which the vehicle is going to travel is the starting region. When the region in which the vehicle is going to travel is the starting region, the routine proceeds to step S208. Otherwise, the routine proceeds to step S209.

Step S208

The determination unit 13 sets the drive mode to the electric motor mode. In the present embodiment, the determination unit 13 notifies the driving control ECU 90 that the drive mode is set to the electric motor mode. The driving control ECU 90 causes the electric motor ECU 30 to control traveling using the electric motor 31.

Step S209

The determination unit 13 sets the drive mode to the internal combustion engine mode. In the present embodiment, the determination unit 13 notifies the driving control ECU 90 that the drive mode is set to the internal combustion engine mode. The driving control ECU 90 causes the internal combustion engine ECU 20 to control traveling using the internal combustion engine 21.

Step S210

The creation unit 11 determines whether a condition for updating the predicted amount of regenerative energy is satisfied. The updating condition and the degree of matching are as described in step S108 of the first driving control process. When the updating condition is satisfied, the routine proceeds to step S211. Otherwise, the routine proceeds to step S204.

Step S211

The estimation unit 12 updates the period during which the regenerative energy can be recovered and the predicted amount of regenerative energy by re-estimating the period during which the regenerative energy can be recovered and the predicted amount of regenerative energy. The updating method is as described in step S109 of the first driving control process. After this step, the routine proceeds to step S204.

In the above process, the two drive modes are set: the electric motor mode in which the vehicle travels using only the electric motor 31, and the internal combustion engine mode in which the vehicle travels using only the internal combustion engine 21. As in the above condition (2-3), when the amount of regenerative energy recovery is predicted to be large, opportunities for the vehicle to travel using the electric motor 31 are increased as compared to when the amount of regenerative energy recovery is predicted to be small. Fuel efficiency can thus be improved. By focusing on this, the predicted amount of regenerative energy recovery can be used for switching control between any two of three drive modes, namely the electric motor mode, the internal combustion engine mode, and a hybrid mode, and for switching control among the three drive modes. The hybrid mode is a mode in which the vehicle travels using both the electric motor 31 and the internal combustion engine 21.

For example, when the amount of regenerative energy recovery is predicted to be large, opportunities to switch from the internal combustion engine mode to the hybrid mode are increased or opportunities to switch from the hybrid mode to the electric motor mode are increased as compared to when the amount of regenerative energy recovery is predicted to be small.

Effects

The driving control device 10 according to the present embodiment can quantitatively predict the amount of regenerated energy recovery at an early stage by using a speed profile that predicts the speed of the vehicle. Suitable driving control can be performed by using this prediction result. That is, when the amount of regenerative energy recovery is predicted to be large, opportunities for the vehicle to travel using the electric motor 31 are increased as compared to when the amount of regenerative energy recovery is predicted to be small. Fuel efficiency can thus be improved.

When the vehicle travels using the electric motor 31, the driving control device 10 allocates a region in which the regenerative energy predicted to be recoverable is consumed to the two regions, namely the starting region and the quasi-steady traveling region, according to the traveling state of the vehicle so as to reduce the overall fuel consumption of the internal combustion engine 21. Accordingly, fuel efficiency can further be improved.

The driving control device 10 can reduce the number of parameters for calculation of the predicted amount of regenerative energy recovery by approximating the speed profile by Gaussian functions. Moreover, the driving control device 10 can reduce the amount of calculation by referring to the numerical table for the Gaussian functions prepared in advance.

Since the driving control device 10 can create a speed profile based on the driving history of the user or a person other than the user, the predicted amount of regenerative energy recovery can be estimated even when a driving route is not set by the user. When a driving route is set by the user, a speed profile can be created using the driving route, and the estimation accuracy can be improved.

Since the driving control device 10 corrects the predicted amount of regenerative energy recovery based on the variable factors that are considered to affect the amount of regenerative energy recovery, the estimation accuracy can be improved by reflecting the variable factors.

When the degree of matching between the speed profile and a change in actual speed of the vehicle with time is low, the driving control device 10 re-estimates the predicted amount of regenerative energy recovery. The estimation accuracy can thus be improved.

When determining the drive mode, the driving control device 10 determines which of the internal combustion engine 21 and the electric motor 31 is suitable in view of the storability of the regenerative energy, the operating efficiency, and the attainability of the required power based not only on the predicted amount of regenerative energy recovery but also on the SOC of the battery 41, the speed of the vehicle, the required power, etc. The reliability and stability of the vehicle control can thus be improved.

Although one embodiment of the present disclosure is described above, the present disclosure can be modified as appropriate. The present disclosure can be interpreted not only as a driving control device but also as a driving control method that is performed by a driving control device including a processor and a memory, a driving control program, a computer-readable non-transitory storage medium storing the driving control program, a vehicle equipped with the driving control device, etc.

The present disclosure is useful for driving control devices that are mounted on vehicles etc.

What is claimed is:

1. A driving control device that is mounted on a vehicle including an electric motor and an internal combustion engine as power sources, the driving control device comprising:
a processor configured to:
create a speed profile that predicts a speed of the vehicle at each time;
approximate the speed profile by a predetermined approximate model and estimate a predicted amount of regenerative energy based on an approximation result, the regenerative energy being energy that is recoverable by regenerative braking of the electric motor;
set a first region and a second region in the approximation result as a region in which the vehicle travels using the electric motor, the first region being a region from a timing of starting of the vehicle until a first time has elapsed from the timing of starting of the vehicle, and the second region being a region from a predetermined timing until a timing when the regenerative energy becomes recoverable,
wherein a second time is a period from the predetermined timing to the timing when the regenerative energy becomes recoverable; and
determine the first time in the first region and the second time in the second region by allocating the predicted amount of the regenerative energy to the first region and the second region.

2. The driving control device according to claim 1, wherein the processor is configured to:
determine the first time and the second time so as to minimize an amount of fuel predicted to be consumed when the vehicle is caused to travel using the internal combustion engine during a time region from an end timing of the first region to the predetermined timing.

3. The driving control device according to claim 1, wherein the processor is configured to:
calculate fuel consumption amounts of a plurality of patterns in which the predicted amount of the regenerative energy is allocated to the first region and the second region based on a plurality of predetermined allocation ratios, the fuel consumption amounts being predicted when the vehicle is caused to travel using the internal combustion engine in a region other than the first region and the second region; and
determine the first time and the second time based on an allocation ratio of a pattern having the smallest fuel consumption amount.

4. The driving control device according to claim 1, wherein the processor is configured to:
determine only the first time by allocating the predicted amount of the regenerative energy to only the first region when the vehicle is traveling at a predetermined low speed; and
determine the first time and the second time by allocating the predicted amount of the regenerative energy to the first region and the second region when the vehicle is not traveling at the predetermined low speed.

5. The driving control device according to claim 4, wherein the predetermined low speed is determined based on a combination of an average speed of the vehicle and a required travel time in a predetermined section.

6. The driving control device according to claim 1, wherein the processor is configured to:
determine the first time and the second time based on the predicted amount of regenerative energy minus energy loss in the electric motor.

7. The driving control device according to claim 1, wherein the processor is configured to:
determine the first time and the second time in such a manner that a maximum value of power that is generated by the electric motor in the first region and a maximum value of power that is generated by the electric motor in the second region become equal.

8. The driving control device according to claim 1, wherein the processor is configured to:
determine the first time and the second time in such a manner that priority is given to one of the first region and the second region, the one of the first region and the second region having smaller energy loss in the electric motor.

9. The driving control device according to claim 1, wherein the processor is configured to:
create the speed profile based on either or both of a driving history of a user and a driving history of a person other than the user.

10. The driving control device according to claim 1, wherein the predetermined approximate model is a model that approximates a change in the speed of the vehicle with time as represented by the speed profile by using a sum of Gaussian functions having different peak positions.

11. The driving control device according to claim 10, wherein the processor is configured to:
calculate parameters of the Gaussian functions by using at least two of the following values: the speed of the vehicle, a traveled distance, and required travel time.

12. The driving control device according to claim 10, wherein the processor is configured to:
derive power based on the approximation result, set one or more periods during which the power is negative as a period during which the regenerative energy is recoverable, and calculate a time integral value of magnitude of the power in the period as an estimated value of the predicted amount of regenerative energy in the period, the power being represented by a sum of power that contributes to a change in kinetic energy of the vehicle and power that is dissipated by running resistance.

13. The driving control device according to claim 12, wherein the processor is configured to:
estimate the predicted amount of regenerative energy based further on one or more variable factors.

14. The driving control device according to claim 13, wherein the one or more variable factors includes at least one of the following factors: a type of road surface, a slope of the road surface, a load weight of the vehicle, and weather.

15. The driving control device according to claim 13, wherein the processor is configured to:
correct the power based on the one or more variable factors.

16. The driving control device according to claim 13, wherein the processor is configured to:
correct the time integral value based on the one or more variable factors.

17. The driving control device according to claim 12, wherein the processor is configured to:
determine that the vehicle travels using the electric motor when a condition is satisfied, the condition including a condition that a sum of energy for the electric motor currently stored in the vehicle and the predicted amount of regenerative energy in the subsequent period is equal to or larger than a threshold.

18. A driving control method that is performed by a driving control device mounted on a vehicle including an electric motor and an internal combustion engine as power sources, the driving control method comprising:
creating a speed profile that predicts a speed of the vehicle at each time;
approximating the speed profile by a predetermined approximate model and estimating a predicted amount of regenerative energy based on an approximation result, the regenerative energy being energy that is recoverable by regenerative braking of the electric motor; and
setting, based on the predicted amount of regenerative energy, a first region and a second region in the approximation result as a region in which the vehicle travels using the electric motor, the first region being a region from a timing of starting of the vehicle until a first time has elapsed from the timing of starting of the vehicle, and the second region being a region from a predetermined timing until a timing when the regenerative energy becomes recoverable,
wherein a second time is a period from the predetermined timing to the timing when the regenerative energy becomes recoverable; and
determining the first time in the first region and the second time in the second region by allocating the predicted amount of the regenerative energy to the first region and the second region.

19. A non-transitory storage medium storing instructions that are executable by a processor of a driving control device mounted on a vehicle including an electric motor and an internal combustion engine as power sources and that cause the processor to perform functions comprising:
creating a speed profile that predicts a speed of the vehicle at each time;

approximating the speed profile by a predetermined approximate model and estimating a predicted amount of regenerative energy based on an approximation result, the regenerative energy being energy that is recoverable by regenerative braking of the electric motor;

setting a first region and a second region in the approximation result as a region in which the vehicle travels using the electric motor, the first region being a region from a timing of starting of the vehicle until a first time has elapsed from the timing of starting of the vehicle, and the second region being a region from a predetermined timing until a timing when the regenerative energy becomes recoverable, wherein a second time is a period from the predetermined timing to the timing when the regenerative energy becomes recoverable; and determining the first time in the first region and the second time in the second region by allocating the predicted amount of the regenerative energy to the first region and the second region.

* * * * *